Oct. 6, 1959                J. F. FINN                2,907,041
                              GOGGLES
Filed Feb. 10, 1958                            2 Sheets-Sheet 1
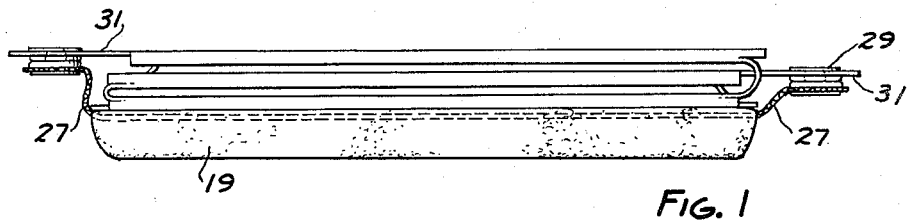
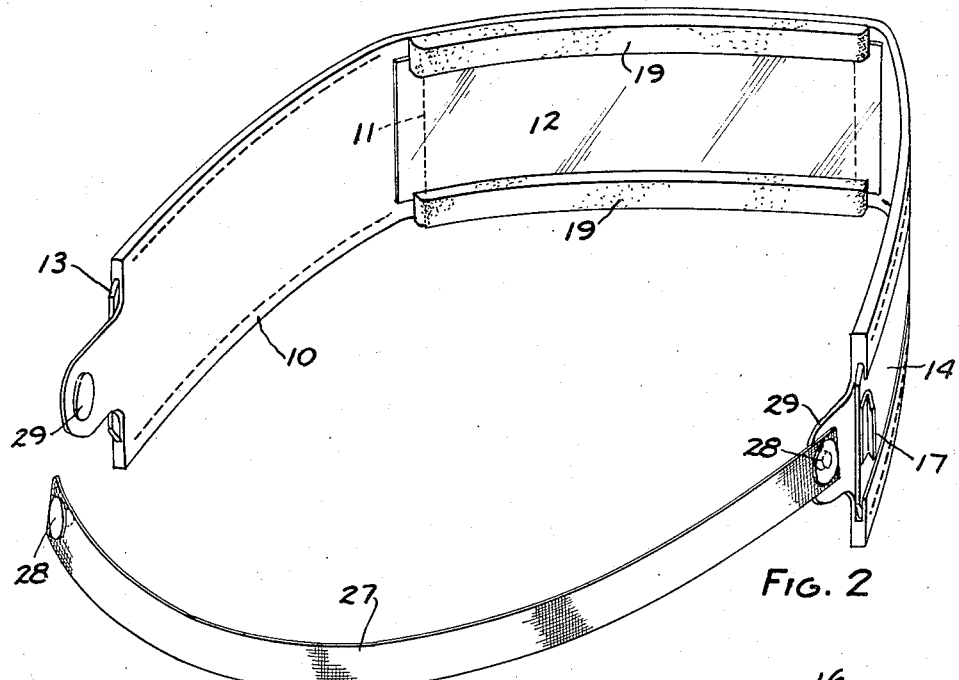
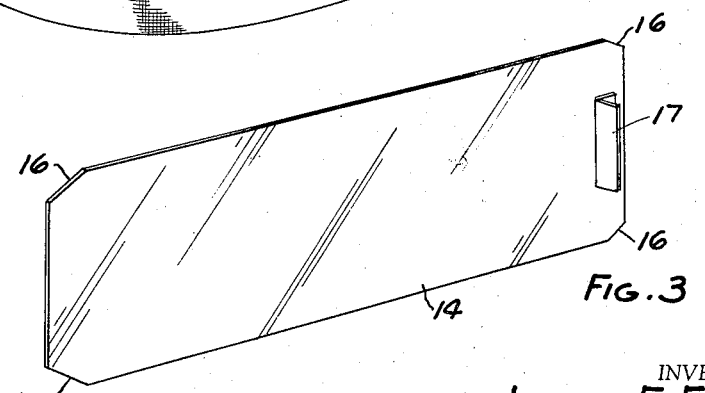
INVENTOR.
JAMES F. FINN
BY
ATTORNEYS Oct. 6, 1959
J. F. FINN
2,907,041
GOGGLES
Filed Feb. 10, 1958
2 Sheets-Sheet 2
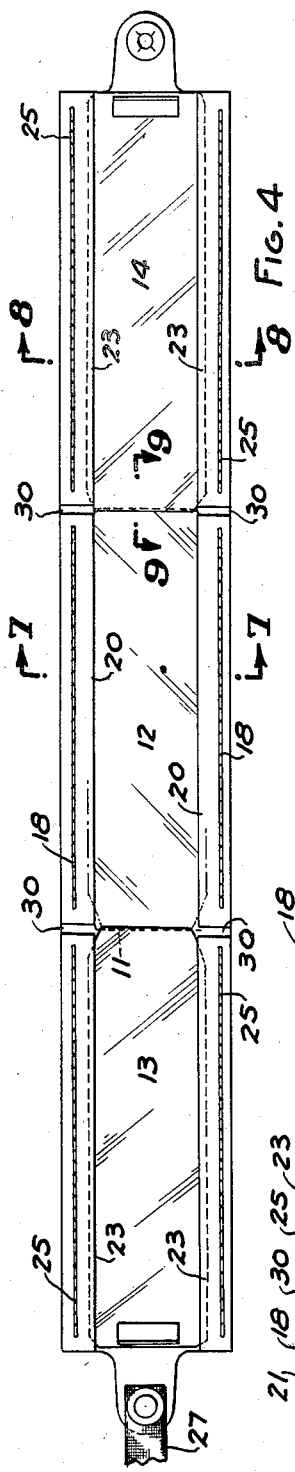
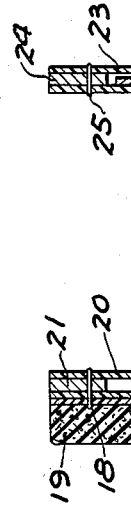
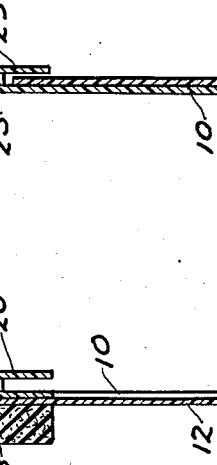
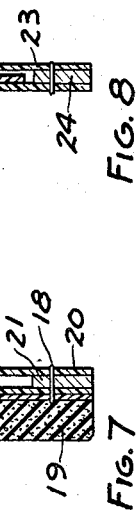
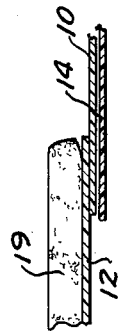
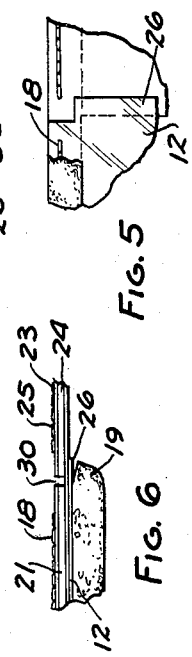
INVENTOR.
JAMES F. FINN
BY
*Barnes, Kisselle, Raisch & Choate*
ATTORNEYS United States Patent Office 2,907,041
Patented Oct. 6, 1959

2,907,041

GOGGLES

James F. Finn, Detroit, Mich.

Application February 10, 1958, Serial No. 714,266

8 Claims. (Cl. 2—14)

This invention relates to goggles and particularly to goggles having a plurality of light filter elements which have differing light-transmitting characteristics.

The use of goggles in sports and industry has long been quite extensive to protect the eyes of the wearer from air particles and from various harmful light conditions. In such goggles it is not only preferred that the goggles be light in weight but, in addition, it is desirable that the wearer be permitted to change the viewing piece to provide a differently colored viewing area without removing the goggles.

It is an object of this invention to provide goggles which have an optically clear viewing area and may be readily changed without removal from the head of a wearer to provide a viewing area having different light-transmitting characteristics.

It is a further object of this invention to provide such a goggle structure which is light in weight.

It is a further object of this invention to provide such a goggle structure which can be folded into a compact package which can be carried in the pocket.

It is a further object of this invention to provide such a goggle structure which can be made at low cost.

Basically, the goggle construction comprises a head-encircling band which has an eye opening therein and supports an optically clear filter element over the opening. Additional filter elements having different light-transmitting characteristics are slidably mounted on the band and are slidable longitudinally on the band so that they may be selectively brought in front of the eye opening.

In the drawings:

Fig. 1 is a side elevational view of the goggles embodying the invention, the goggles being shown in folded condition.

Fig. 2 is a perspective view of the goggles.

Fig. 3 is a perspective view of one of the movable filter elements.

Fig. 4 is a plan view of the goggles.

Fig. 5 is a fragmentary view of a portion of the goggles shown in Fig. 4, parts being broken away.

Fig. 6 is an end view of the portion of the goggles shown in Fig. 5.

Fig. 7 is a sectional view on an enlarged scale taken along the line 7—7 in Fig. 4.

Fig. 8 is a sectional view on an enlarged scale taken along the line 8—8 in Fig. 4.

Fig. 9 is a fragmentary sectional view on an enlarged scale taken along the line 9—9 in Fig. 4.

Referring to Figs. 2 and 4, the goggles embodying the invention comprise a head-encircling band 10 which has a central rectangular opening 11 providing a viewing area through which the wearer can look when wearing the goggles. A first filter element 12 is mounted over the opening 11. Filter element 12 has predetermined light-transmitting characteristics and is preferably clear, that is, has no discriminating action on light.

Second and third filter elements 13, 14 are slidably mounted on band 10 and are movable longitudinally of the band 10 to and from a position overlying filter element 12. Filter elements 13, 14 have different predetermined light-transmitting characteristics. For example, filter element 13 may be amber while filter element 14 may be smoked in color.

Filter elements 13, 14 are identical in size and shape. As shown in Fig. 3 filter element 14 is generally rectangular and has the corners 16 thereof bevelled. A tab 17 is fixed to one end of the filter element 14 and projects outwardly to serve as means for grasping the filter element and sliding it along the length of the band 10. Tab 17 abuts against the end of filter element 12 to limit the movement of filter elements 13 or 14 toward filter element 12.

The first filter element 12 is fixed over opening 11 by stitching 18 or other suitable means along the side edges of the opening 11. Strips 19 of resilient sponge-like material are fixed on head band 10 adjacent the side edges of opening 11 and on the same side as filter element 12 to engage the forehead and nose of the wearer.

The filter elements 13, 14 are supported on the head band for sliding movement by means of channels into which the longitudinal edges of the filter elements extend. In the area adjacent the opening 11 the channels are formed by strips 20 mounted on the band 10 and held in spaced relationship thereto by spacer strips 21. Stitching 18 fixes the strips 20, 21 as well as filter element 12 on the band 10.

In the portions of the band between opening 11 and the ends of the band the channels are formed by strips 23 spaced from the band by spacer strips 24 and held thereon by stitching 25. As shown in Figs. 4 and 5 the adjacent ends of strips 20, 23 are spaced from one another so that the goggles can be readily folded at these areas 30 into a compact package. The ends 26 of the center filter element 12 project beyond the ends of the opening 11 as shown in Figs. 2 and 5 to prevent the entry of air or dirt particles into the eye area of the wearer.

A strap 27 is removably connected to the ends of band 10 by snap fastener elements 28, 29. The wearer dons the spectacles with the band 10 and strap 27 circling his head and the opening 11 adjacent the eyes. The wearer may selectively move filter elements 13, 14 over the eye opening 11 to provide the proper protection for the eyes. In this manner the same goggles can be used for varying light conditions.

In order to fold the goggles to a compact package the goggles are removed and the portions of the band 10 between the ends thereof and openings 11 are folded along the folds 30 formed by the spacer strips 20, 23 to a position as shown in Fig. 1. Strap 27 is then fastened to one end 31 of the band 10 and is passed under the filter element 12 and fastened to the other end 32 which has been brought out from between the fold area.

The band 10 may be made of flexible cloth, plastic or leather. Filter elements 12, 13 and 14 are preferably made from plastic sheets having the desired light-transmitting characteristics.

I claim:

1. In a goggle structure, the combination comprising a generally rectangular band of flexible material having a length several times its width, a strip, means for detachably connecting said strip to the ends of said band to provide a head-encircling construction, said band being formed with a generally rectangular opening at the center thereof, said opening having its greater dimension extending longitudinally of the band, a first optical filter element having predetermined light-transmitting characteristics, means for mounting said first filter element adjacent to and overlying said opening, a second optical filter element having predetermined light-transmitting characteristics different from those of said first filter element, means for mounting said second filter element on said band comprising a first pair of strips mounted along the longitudinal edges of the band between the central portion of the band and one end thereof, said strips forming channels for receiving said second filter element, a third filter element having light-transmitting characteristics different from those of said first and second filter elements, means for mounting said third filter element on said band comprising a second pair of strips mounted on said band along the longitudinal edges thereof in the portion of said band between said central portion and the other end thereof, said first and second pair of strips being mounted on the side of said band opposite to the side on which said first filter element is mounted, and a third pair of strips mounted along the edges of said opening in said band on the side opposite from said first filter element and on the same side of the band as the first and second pair of strips, said first and second filter elements being slidable longitudinally along said band into the channel formed by said third pair of strips into parallel and overlying relationship with said first filter element.

2. The combination set forth in claim 1 wherein the adjacent edges of said first and third pairs of strips and second and third pairs of strips are spaced from one another sufficiently to permit said optical filter elements to be folded into overlying relationship with one another in order to provide a compact goggle construction.

3. The combination set forth in claim 1 including tabs bent outwardly from the plane of said second and third filter elements in the ends thereof furthermost from the central portion of the band, said tabs providing a means for grasping the filter elements and providing a stop to limit the movement of said filter elements into overlying relationship to said first filter element.

4. The combination set forth in claim 1 wherein the corners of said second and third filter elements are bevelled.

5. The combination set forth in claim 1 wherein said means for detachably connecting the ends of said strip to the ends of said band comprise snap fasteners.

6. In a goggle structure, the combination comprising a band of flexible material having a length several times its width, a strip, means for connecting said strip to the ends of said band to provide a head encircling construction, said band being formed with an opening at the center thereof, said opening having its greater dimension extending longitudinally of the band, a first optical filter element having predetermined light transmitting characteristics, means for mounting said first filter element adjacent and overlying said opening, a second optical filter element having predetermined light transmitting characteristics different from those of said filter element, first means defining channels on the portion of said band between one end thereof and said opening for receiving and mounting said second filter element on said band, a third filter element having light transmitting characteristics different from those of said first and second filter elements, second means defining channels on the portion of said band between the other end thereof and said opening for receiving and mounting said third filter element on said band, and third means on said band defining channels adjacent said central opening, said second and third filter elements being slidable longitudinally along said band into the channels formed by said latter means into parallel and overlying relationship with said first filter element.

7. The combination set forth in claim 6 wherein adjacent edges of said first and third channel forming means and said second and third channel forming means are spaced from one another sufficiently to permit said optical filter elements to be folded into overlying relationship with one another in order to provide a compact goggle construction.

8. In a goggle structure, the combination comprising a band of flexible material having a length several times its width, a strip, means for connecting said strip to the ends of said band to provide a head encircling construction, said band being formed with an opening at the center thereof, said opening having its greater dimension extending longitudinally of the band, a first optical filter element having predetermined light transmitting characteristics, means for mounting said first filter element adjacent and overlying said opening, a second optical filter element having predetermined light transmitting characteristics different from those of said filter element, means defining channels on the portion of said band between one end thereof and said opening for receiving and mounting said second filter element on said band, and means on said band defining channels adjacent said central opening, said second filter element being slidable longitudinally along said band into said channels formed by said latter means in parallel and overlying relationship with said first filter element.

References Cited in the file of this patent

UNITED STATES PATENTS

| 2,259,680 | Caudell | Oct. 21, 1941 |

FOREIGN PATENTS

| 159,047 | Great Britain | Feb. 24, 1921 |
| 928,963 | France | June 16, 1947 |